United States Patent
Rous et al.

(10) Patent No.: US 9,886,853 B2
(45) Date of Patent: Feb. 6, 2018

(54) SYSTEM FOR TRANSMITTING INFORMATION WHEN A MOTOR VEHICLE DRIVING IN THE WRONG DIRECTION HAS BEEN DETECTED, CORRESPONDING TRANSMITTING AND RECEIVING DEVICES AND CORRESPONDING TRANSMITTING AND RECEIVING METHODS

(71) Applicant: Robert Bosch GmbH, Stuttgart (DE)

(72) Inventors: Martin Rous, Mundelsheim (DE); Volker Hofsaess, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 31 days.

(21) Appl. No.: 14/915,334

(22) PCT Filed: Sep. 1, 2014

(86) PCT No.: PCT/EP2014/068469
§ 371 (c)(1),
(2) Date: Feb. 29, 2016

(87) PCT Pub. No.: WO2015/032708
PCT Pub. Date: Mar. 12, 2015

(65) Prior Publication Data
US 2016/0217687 A1    Jul. 28, 2016

(30) Foreign Application Priority Data

Sep. 6, 2013  (DE) .......................... 10 2013 217 833
Nov. 15, 2013 (DE) .......................... 10 2013 223 400
May 8, 2014   (DE) .......................... 10 2014 208 659

(51) Int. Cl.
*G08G 1/00* (2006.01)
*G08G 1/056* (2006.01)
(Continued)

(52) U.S. Cl.
CPC ............... *G08G 1/056* (2013.01); *B60Q 1/50* (2013.01); *G08G 1/092* (2013.01); *G08G 1/162* (2013.01);
(Continued)

(58) Field of Classification Search
CPC combination set(s) only.
See application file for complete search history.

(56) References Cited

U.S. PATENT DOCUMENTS 8,125,349 B2 *  2/2012  May .................. G08G 1/056
                                                    340/905
8,421,648 B2 *  4/2013  Konaka ............... B62D 15/029
                                                    340/438
(Continued)

FOREIGN PATENT DOCUMENTS

CN    101391587 A    3/2009
CN    102381298 A    3/2012
(Continued)

OTHER PUBLICATIONS

International Search Report for PCT/EP2014/068469, dated Mar. 3, 2015.

*Primary Examiner* — Travis Hunnings
(74) *Attorney, Agent, or Firm* — Norton Rose Fulbright US LLP; Gerard Messina

(57) ABSTRACT

A system for transferring information upon detection of wrong-way driving of a motor vehicle includes a transmitting device and a receiving device. The transmitting device encompasses a light source that is embodied to emit a light-coded signal, as well as a recognition unit that is embodied to detect wrong-way driving of a motor vehicle. The transmitting device is configured to emit the light-coded signal by way of the light source as soon as the recognition unit detects wrong-way driving of a motor vehicle, the light-coded signal containing an information item regarding (Continued)

wrong-way driving of the motor vehicle. The receiving device is configured to execute a row-by-row and/or column-by-column image scan, and to receive and evaluate a light-coded signal completely within one image.

17 Claims, 2 Drawing Sheets

(51) Int. Cl.
　　*G08G 1/09*　　　(2006.01)
　　*G08G 1/16*　　　(2006.01)
　　*H04B 10/116*　　(2013.01)
　　*B60Q 1/50*　　　(2006.01)
　　*B60Q 9/00*　　　(2006.01)

(52) U.S. Cl.
　　CPC ........... *G08G 1/164* (2013.01); *H04B 10/116* (2013.01); *B60Q 9/008* (2013.01)

(56) References Cited

U.S. PATENT DOCUMENTS

| | | | | |
|---|---|---|---|---|
| 8,428,861 | B1* | 4/2013 | Williams | G08G 1/164 |
| | | | | 701/301 |
| 8,754,782 | B2* | 6/2014 | Tagawa | G08G 1/075 |
| | | | | 340/438 |
| 8,965,617 | B2* | 2/2015 | Takahara | G01C 21/3697 |
| | | | | 701/22 |
| 9,024,785 | B2* | 5/2015 | Mochizuki | G08G 1/096775 |
| | | | | 340/425.5 |
| 9,478,138 | B2* | 10/2016 | Nagy | G08G 1/056 |
| 2008/0122606 | A1* | 5/2008 | Bradley | B60Q 1/0017 |
| | | | | 340/468 |
| 2009/0102683 | A1* | 4/2009 | May | E01F 9/696 |
| | | | | 340/907 |
| 2013/0162448 | A1* | 6/2013 | Mochizuki | G08G 1/096775 |
| | | | | 340/905 |

FOREIGN PATENT DOCUMENTS

| | | |
|---|---|---|
| DE | 295 04 445 | 5/1995 |
| EP | 0 045 044 | 2/1982 |
| JP | 2008 062673 | 3/2008 |
| JP | 2008062673 A | 3/2008 |

\* cited by examiner

SYSTEM FOR TRANSMITTING INFORMATION WHEN A MOTOR VEHICLE DRIVING IN THE WRONG DIRECTION HAS BEEN DETECTED, CORRESPONDING TRANSMITTING AND RECEIVING DEVICES AND CORRESPONDING TRANSMITTING AND RECEIVING METHODS

BACKGROUND OF THE INVENTION

1. Field of the Invention

The present invention relates to a system for transferring information upon detection of wrong-way driving of a motor vehicle, to associated transmitting and receiving devices, and to corresponding methods for transmitting and receiving information upon detection of wrong-way driving of a motor vehicle.

2. Description of the Related Art

"Wrong-way drivers" cause considerable personal injury and property damage in the event of an accident. In many cases, accidents caused by wrong-way drivers end up being fatal to those involved in the accident. Only a few approaches to preventing or recognizing wrong-way driving of a motor vehicle are currently to be found in the existing art. The existing art also contains at most a few approaches with which, in the event a motor vehicle driving the wrong way is recognized in traffic, the other vehicles participating in traffic can be warned about the motor vehicle driving the wrong way.

BRIEF SUMMARY OF THE INVENTION

The present invention furnishes a transmitting device for transferring information upon detection of wrong-way driving of a motor vehicle. The transmitting device encompasses a light source that is embodied to emit a light-coded signal. The transmitting device furthermore has a recognition unit that is embodied to detect wrong-way driving of a motor vehicle. The transmitting device is embodied to emit the light-coded signal by way of the light source as soon as the recognition unit detects wrong-way driving of a motor vehicle. According to the present invention the light-coded signal contains an information item regarding wrong-way driving of the motor vehicle.

The advantage of the transmitting device according to the present invention is that with it, drivers of motor vehicles moving in road traffic can be warned in timely fashion of a motor vehicle driving the wrong way, which allows them to react more quickly. Recognition of wrong-way driving can be conveyed via a light-coded signal, which enables a receiver of the light-coded signal to evaluate the situation, for example in terms of the probability of collision with the motor vehicle driving the wrong way, and allows the initiation of active safety measures such as braking or an evasive maneuver. Using the transmitting device according to the present invention it is possible to warn both a wrong-way driver and non-wrong-way vehicle drivers. The transmitting device according to the present invention also makes it possible, however, to transfer any other information via light-coded signals upon detection of wrong-way driving of a motor vehicle, and is not limited to the transfer of warning signals.

Preferably the recognition unit is embodied to detect wrong-way driving of a motor vehicle in road traffic, and the light-coded signal contains an information item regarding wrong-way driving of a motor vehicle in road traffic.

Preferably the transmitting device is disposed in a motor vehicle.

Preferably the transmitting device is disposed in an infrastructure element. Also preferably, the infrastructure element is an active road sign. Also preferably, this active road sign is located alongside a road or an expressway.

Preferably the recognition unit is capable of receiving an information item, obtained from traffic observations, regarding wrong-way driving of a motor vehicle in road traffic. In such an embodiment the operators of motor vehicles in road traffic can be warned particularly promptly, since the information item regarding wrong-way driving of a motor vehicle, for example, does not need to be obtained by sensors possessed by the recognition unit on site, i.e. at the location of the wrong-way driving, but instead can be transferred, for example, via radio, via the internet, or via any other network.

Additionally preferably, the recognition unit has at least one sensor that serves to detect wrong-way driving of a motor vehicle.

Preferably the transmitting device is connectable to the headlight of a motor vehicle, and the headlight of the motor vehicle is usable as a light source of the transmitting device. Headlights are possessed by every registered motor vehicle on the road. In such an embodiment there is therefore no need to provide in the transmitting device an additional light source or other light-emitting apparatus that serves the purpose of warning motor vehicles in the event that a wrong-way driver is detected.

Preferably the light source is an LED headlight having at least one light-emitting diode. LED headlights are particularly well suited for embodying a transmitting device according to the present invention, since they make available several light-emitting diodes to which control can be applied individually, making it comparatively simple to convey information by way of light-coded signals.

In a preferred embodiment the light-coded signal is generated by modulation of the light of the light source. Preferably such modulation of the light is made possible by the use of a current-modulated light source. Modulation of the light of the light source allows information to be transferred very quickly from the transmitting device to, for example, a receiving device. Important reaction time is thereby gained, in which time, for example, the driver or also an automatic system provided in the motor vehicle can prevent a collision with oppositely traveling motor vehicles or undertake measures that reduce the probability of a collision with oppositely traveling motor vehicles.

Preferably the modulation of the light of the light source is implemented by application of control to different groups of light-emitting diodes of the LED headlight, the duration of the application of control to the light-emitting diodes being variable over time from one group to another and being predetermined for each group of light-emitting diodes. In an exemplifying embodiment of this kind, the light-coded signal is therefore generated by a predetermined pattern of control application to different groups of light-emitting diodes of the LED headlight.

Also made available is a receiving device that is embodied to execute a row-by-row and/or column-by-column image scan, and to receive and evaluate a light-coded signal emitted toward the receiving device. According to the present invention the receiving device is embodied to receive the light-coded signal completely within one image. The advantage of such an image scan is that with it, recognition of a light-coded signal is therefore possible within one image.

Within a row-by-row or column-by-column image scan, the light-coded signal can be completely sensed within one image or within one frame, for example within one camera frame. Light-coded signals can thus be received very quickly, thus enhancing road traffic safety.

Preferably the receiving device is installed in a motor vehicle.

Preferably the receiving device is a camera system. Also preferably, the camera system is a front camera, i.e. a camera directed from inside toward the front-end region of a motor vehicle and toward the region in front of the front end of the motor vehicle. Also preferably, the camera system is a rear view camera, i.e. a camera directed from inside toward the rear end of a motor vehicle and toward the region behind the rear end of the motor vehicle. Additionally preferably, any region of a motor vehicle environment can be sensed by the camera system. Fast and accurate scanning of a light-coded signal is possible with a camera system.

Also preferably, the receiving device has a rolling shutter. The advantage of this kind of image scan is that with it the signal can be recognized very quickly in one image.

A method for transmitting information upon detection of wrong-way driving of a motor vehicle is also made available. The method encompasses the following method steps: furnishing a transmitting device according to the present invention; detecting wrong-way driving of a motor vehicle; emitting a light-coded signal by way of the transmitting device upon detection of wrong-way driving of a motor vehicle. Road traffic safety can be enhanced by execution of such a method, since the motor vehicles traveling in road traffic can be warned promptly of a wrong-way driver. Any other signals, however, which do not need to be warning signals, can also be conveyed by way of such a method.

Preferably the light-coded signal contains, in the emitting step, an information item regarding wrong-way driving of a motor vehicle. In such an embodiment of the method, the vehicle operators of motor vehicles that are exposed to the risk of collision with a wrong-way driver can react promptly and take measures in timely fashion to avoid a collision.

A method for receiving and evaluating information is furthermore furnished. The method encompasses the following method steps: furnishing a receiving device according to the present invention; receiving a light-coded signal by way of the receiving device; evaluating the received light-coded signal.

In a preferred refinement of the method it further encompasses the step of: furnishing a control signal as soon the fact that the light-coded signal contains an information item regarding wrong-way driving of a motor vehicle is detected in the evaluating step. A control signal of this kind can be furnished, for example, to a driver assistance system or to a control unit, which can be installed, for example, inside a motor vehicle. That driver assistance system or control unit can then initialize or perform transference of the motor vehicle into a safe state. For example, the motor vehicle can maneuvered to the side of the road by the driver assistance system. The risk or probability of an accident is thereby greatly decreased. Road traffic safety is thus enhanced.

Also made available is a system for transferring information upon detection of wrong-way driving of a motor vehicle, which system encompasses a transmitting device according to the present invention and a receiving device according to the present invention. Thanks to the use of a transmitting device according to the present invention and a receiving device according to the present invention, the advantages recited with regard to them are effective in combination.

In a preferred embodiment of the system the transmitting device is embodied to emit the light-coded signal completely within one image scanning operation of the receiving device, and the receiving device is embodied to receive the light-coded signal completely within one image. Also preferably, the receiving device is embodied to receive the light-coded signal completely within one image scanning operation.

In a particularly preferred embodiment of the system a first motor vehicle has a receiving device and/or a second motor vehicle has a transmitting device.

Preferably the transfer of information occurs upon detection of wrong-way driving of a motor vehicle in road traffic. "Road traffic" refers to all motor vehicles moving, within a radius of one kilometer around the recognition unit, on the surrounding roads and streets open to anyone for utilization. Also preferably, "road traffic" refers to all motor vehicles moving, within a radius of five kilometers around the recognition unit, on the surrounding roads and streets open to anyone for utilization. Particularly preferably, "road traffic" refers to all motor vehicles moving, within a radius of 15 kilometers around the recognition unit, on the surrounding roads and streets open to anyone for utilization. Also preferably, "motor vehicles moving in road traffic" refers to all motor vehicles that are moving on the same directional roadway of any road, expressway, two-lane freeway, or other travel route, such as a motor vehicle having the recognition unit or a motor vehicle having the transmitting device. "Motor vehicles moving in road traffic" also preferably refers to all motor vehicles that are moving on that directional roadway of any road, expressway, two-lane freeway, or other travel route which is also being monitored by the recognition unit of the transmitting device of an infrastructure element. The "directional roadway" can also be the exit from or entrance to any road, expressway, two-lane freeway, or other travel route.

DETAILED DESCRIPTION OF THE INVENTION

Figure 1:
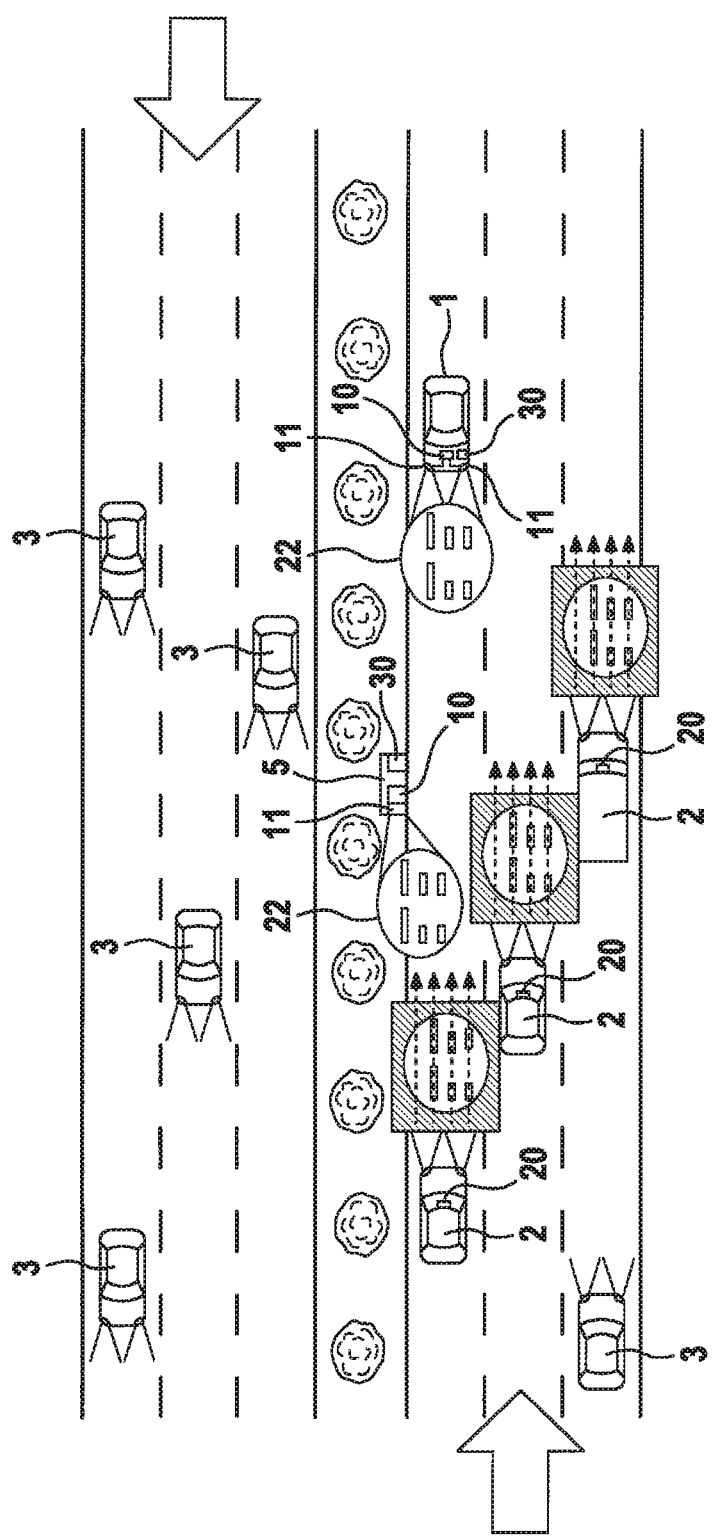
FIG. 1 shows an exemplifying embodiment of a system according to the present invention for transferring information upon detection of wrong-way driving of a motor vehicle, using a transmitting device according to the present invention and a receiving device according to the present invention.

FIG. 1 depicts an exemplifying embodiment of a system according to the present invention for transferring information upon detection of wrong-way driving of a motor vehicle 1, 2, 3 in road traffic, using a transmitting device 10 according to the present invention and a receiving device 20 according to the present invention. More precisely, FIG. 1 shows two respectively three-lane directional roadways, on which a plurality of motor vehicles 1, 2, 3 constituting road traffic are moving and which are part of an expressway. The travel directions of the two respectively three-lane directional roadways are opposite to one another and are indicated by arrows. The exemplifying embodiment of a system according to the present invention for transferring information upon detection of wrong-way driving of a motor vehicle 1, 2, 3 is depicted in FIG. 1 by way of motor vehicles 1, 2, 3 moving on the lower (as seen by the viewer of FIG. 1 of the two directional roadways.

In this exemplifying embodiment the system for transferring information upon detection of wrong-way driving of a motor vehicle 1, 2, 3 encompasses, purely by way of example, two transmitting devices 10 according to the present invention that are disposed in a first motor vehicle 1 and in an infrastructure element 5. Transmitting device 10 installed, in this exemplifying embodiment, in first motor vehicle 1 encompasses, purely by way of example, two light sources 11 provided by front headlights 11 of first motor vehicle 1, while transmitting device 10 installed in infrastructure element 5 encompasses an independent light source 11 that is embodied as a headlight 11 installed in infrastructure element 5. In this exemplifying embodiment both front headlights 11 of first motor vehicle 1 and headlight 11 of infrastructure element 5 are, purely by way of example, LED headlights 11 that each have a plurality of light-emitting diodes 12. LED headlights 11 can also, however, each have only a single light-emitting diode 12. Transmitting device 10 of first motor vehicle 1 and transmitting device 10 of infrastructure element 5 are both respectively embodied to emit a light-coded signal 22 by way of their respective light sources 11, i.e. in this exemplifying embodiment by way of their LED headlights 11. It is also possible, however, to embody systems according to the present invention for transferring information upon detection of wrong-way driving of a motor vehicle 1, 2, 3 in which transmitting devices 10 have light sources 11 that are, for example, not front headlights 11 of first motor vehicle 1 but instead are, purely by way of example, light-emitting apparatuses 11 of transmitting device 10 installed on first motor vehicle 1 expressly for the purpose of transferring information to other motor vehicles 1, 2, 3 in road traffic, which apparatuses also need not be LED headlights 11.

In this exemplifying embodiment the system for transferring information upon detection of wrong-way driving of a motor vehicle 1, 2, 3 in road traffic also encompasses, purely by way of example, three receiving devices 20 according to the present invention that are disposed in three second motor vehicles 2 different from first motor vehicle 1. Receiving device 20 is designed respectively to receive and evaluate a light-coded signal 22 emitted in its direction. In other words, the three second motor vehicles 2 each have a receiving device 20 with which they are capable of receiving and interpreting light-coded signals 22 received from receiving device 20.

Transmitting devices 10 according to the present invention of the system each furthermore encompass a recognition unit 30. In this exemplifying embodiment these recognition units 30 are each embodied to detect wrong-way driving of the first, of a second, and/or of any other motor vehicle 1, 2, 3 in road traffic. In other words, a respective recognition unit 30 encompassed by the respectively associated transmitting device 10, which unit is embodied to detect wrong-way driving of any motor vehicle 1, 2, 3 moving in the close vicinity of recognition unit 30, is installed both in first motor vehicle 1 and in infrastructure element 5, the "close vicinity" in this exemplifying embodiment having, purely by way of example, a radius of 500 meters. Again in other words, in this exemplifying embodiment both first motor vehicle 1 and infrastructure element 5 each have a recognition unit 30 that is provided within the respectively associated transmitting device 10 and is respectively embodied to detect wrong-way driving of any motor vehicle 1, 2, 3 in road traffic, "road traffic" meaning in this exemplifying embodiment, purely by way of example, all motor vehicles 1, 2, 3 moving, within a radius of 500 meters from recognition unit 30, on the surrounding roads and travel routes openly available to anyone for use. In this exemplifying embodiment, recognition units 30 both of first motor vehicle 1 and of infrastructure element 5 monitor all motor vehicles 1, 2, 3 that are moving on the same directional roadway of the expressway shown in FIG. 1, such as first motor vehicle 1 having recognition unit 30 and all motor vehicles 1, 2, 3 that are moving on that directional roadway alongside which infrastructure element 5 is placed. Also belonging to the directional roadway are the entrances to and exits from the lower directional roadway, which are not depicted in FIG. 1.

In this exemplifying embodiment recognition units 30 of transmitting devices 10 have for detection purposes, purely by way of example, several sensors that are capable of promptly detecting wrong-way driving of a motor vehicle 1, 2, 3. It is also possible to embody systems according to the present invention having transmitting devices 10 whose recognition units 30 are capable of receiving an information item, obtained from traffic observations, regarding wrong-way driving of any motor vehicle 1, 2, 3 in road traffic on the directional roadway. In such exemplifying embodiments, recognition units 30 of transmitting devices 10 can detect wrong-way driving of a motor vehicle 1, 2, 3 even earlier. In such exemplifying embodiments, recognition units 30 are thus likewise capable of sensing wrong-way driving of a motor vehicle 1, 2, 3 in road traffic; in such exemplifying embodiments the road traffic monitored by a recognition unit 30 constitutes, for example, all motor vehicles 1, 2, 3 moving, within a radius of 15 kilometers, 30 kilometers, or an even larger radius around recognition unit 30, on the surrounding roads and travel routes open to anyone for use.

Recognition unit 30 disposed, for example, in first motor vehicle 1 can detect both its own wrong-way driving depicted in FIG. 1, i.e. wrong-way driving of first motor vehicle 1 itself, and wrong-way driving of any other motor vehicle 2, 3. It is thus immaterial, for the recognition of wrong-way driving by recognition unit 30, whether first motor vehicle 1 having recognition unit 1 is driving the wrong way, or whether first motor vehicle 1, driving correctly, is encountering a motor vehicle 2, 3 driving the wrong way.

In this exemplifying embodiment of the system according to the present invention, both transmitting devices 10 according to the present invention of first motor vehicle 1 and transmitting devices 10 of infrastructure element 5 are embodied to emit light-coded signal 22 as soon as the respectively associated recognition unit 30 detects wrong-way driving of the first, of the second, and/or of any other motor vehicle 1, 2, 3. In other words, transmitting device 10 of first motor vehicle 1 and transmitting device 10 of infrastructure element 5 begin sending out light-coded signal 22 precisely when their respective recognition units 30 detect wrong-way driving of any motor vehicle 1, 2, 3 in road traffic.

In this exemplifying embodiment infrastructure element 5 itself is embodied, purely by way of example, as active road sign 5, i.e. as an active traffic sign at the roadside.

In this exemplifying embodiment the system encompasses, purely by way of example, a first motor vehicle 1 equipped respectively with a transmitting device 10 according to the present invention and with a recognition unit 30 encompassed thereby, as well as three second motor vehicles 2 each equipped with a receiving device 20 according to the present invention. Systems according to the present invention for transferring information upon detection of wrong-way driving of a motor vehicle 1, 2, 3 can also be embodied, however, with a large number, or any number, of first and second motor vehicles 1, 2. In other words, it is also possible to embody systems according to the present invention in which a large number of first motor vehicles 1 are each equipped with a transmitting device 10 and with a respective recognition unit 30 encompassed thereby, and having a large number of second motor vehicles 2 that are each equipped with a receiving device 20.

It is furthermore also possible to embody systems according to the present invention for transferring information upon detection of wrong-way driving of a motor vehicle 1, 2, 3 having a large number of motor vehicles 1, 2, 3 that each have a transmitting device 10 connected to a light source 11, a receiving device 20, and a recognition unit 30 encompassed by transmitting device 10, so that a motor vehicle 1, 2, 3 is capable on the one hand of emitting a light-coded signal 22 but also of receiving and evaluating or interpreting a light-coded signal 22. It is also possible, however, to embody systems according to the present invention in which both transmitting device 10 and receiving device 20 are not installed in a motor vehicle 1, 2, 3.

In this exemplifying embodiment of the system, light-coded signal 22 contains an information item regarding wrong-way driving of first, second, and/or any other motor vehicle 1, 2, 3 in road traffic. In other words, the information item that can be transferred by way of light-coded signal 22 and is decodable by receiving device 20 is a warning regarding a wrong-way driver moving in road traffic. In FIG. 1, purely by way of example, first motor vehicle 1 depicted at the outer right on the lower of the two three-lane directional roadways is a wrong-way driver. The fact that this first motor vehicle 1 is a wrong-way driver is recognized both by recognition unit 30 of transmitting device 10 of first motor vehicle 1 and by recognition unit 30 of transmitting device 10 of infrastructure element 5 and, as an immediate reaction thereto, light-coded signal 22 is emitted by transmitting devices 10 of first motor vehicle 1 and of infrastructure element 5 via LED headlights 11, i.e. via light sources 11.

Light-coded signal 22 is generated by modulation of the light of light sources 11. In this example, modulation of the light of light sources 11 is accomplished by control application to different groups of light-emitting diodes 12 of LED headlights 11, the duration of the control application to light-emitting diodes 12 being variable over time from one group to another, and being predetermined for each group of light-emitting diodes 12. In other words, similarly to the transmission of Morse signals, some groups of light-emitting diodes 12, for example of the right-hand LED headlight 11 of first motor vehicle 1, have control applied to them briefly using a predetermined timing cycle in order to generate light-coded signal 22, while other groups of light-emitting diodes 12, offset locally with respect to the briefly controlled groups of light-emitting diodes 12, have control applied to them for longer using the same timing cycle, i.e. with a longer duration and a shorter off-time. This can be accomplished in addition to the constant or continuous light emission of other light-emitting diodes 12 of LED headlight 11, so that, for example, the low beam or high beam of first motor vehicle 1 has light-coded signal 22 superimposed onto it. The result is that the light cone generated by LED headlights 11 of first motor vehicle 1, which can constitute e.g. a low beam or a high beam, does not need to be shut off in order to transfer light-coded signal 22.

In this exemplifying embodiment, purely by way of example, receiving devices 20 of second motor vehicles 2 are a respective camera system 20 that is respectively designed to execute a line-by-line image scan. Camera system 20 of a second motor vehicle 2 encompasses a rolling shutter, and in this exemplifying embodiment is directed toward the front end, and the region in front of the front end, of second motor vehicle 2. It is also possible, however, to embody systems according to the present invention in which camera system 20 of a second motor vehicle 2 encompasses a rear view camera and/or a front view camera and/or further cameras that are directed in a direction other than toward the front end or rear end of first motor vehicle 1.

Transmitting device 10 of first motor vehicle 1 is coordinated with receiving devices 20, i.e. with camera systems 20, of second motor vehicles 2 in such a way that a transfer of light-coded signal 22 occurs completely within one image scanning operation of camera system 20. In this exemplifying embodiment this means that transmitting device 10 of first motor vehicle 1 is embodied to emit light-coded signal 22 completely within one line-by-line image scanning operation of camera system 20, while camera system 20 is embodied to sense light-coded signal 22 completely within one line-by-line image scanning operation, i.e. completely within one image or one frame. The image that results upon sensing of light-coded signal 22, emitted from transmitting devices 10 of first motor vehicle 1 and of infrastructure element 5, by camera systems 20 of second motor vehicles 2 is depicted schematically in FIG. 1 in front of each of second motor vehicles 2. In other words, FIG. 1 depicts the image, occurring in one line-by-line image scanning operation of camera system 20, in which light-coded signal 22 emitted by transmitting devices 10 is sensed. An enlargement of this image is depicted in FIG. 2.

Figure 2:
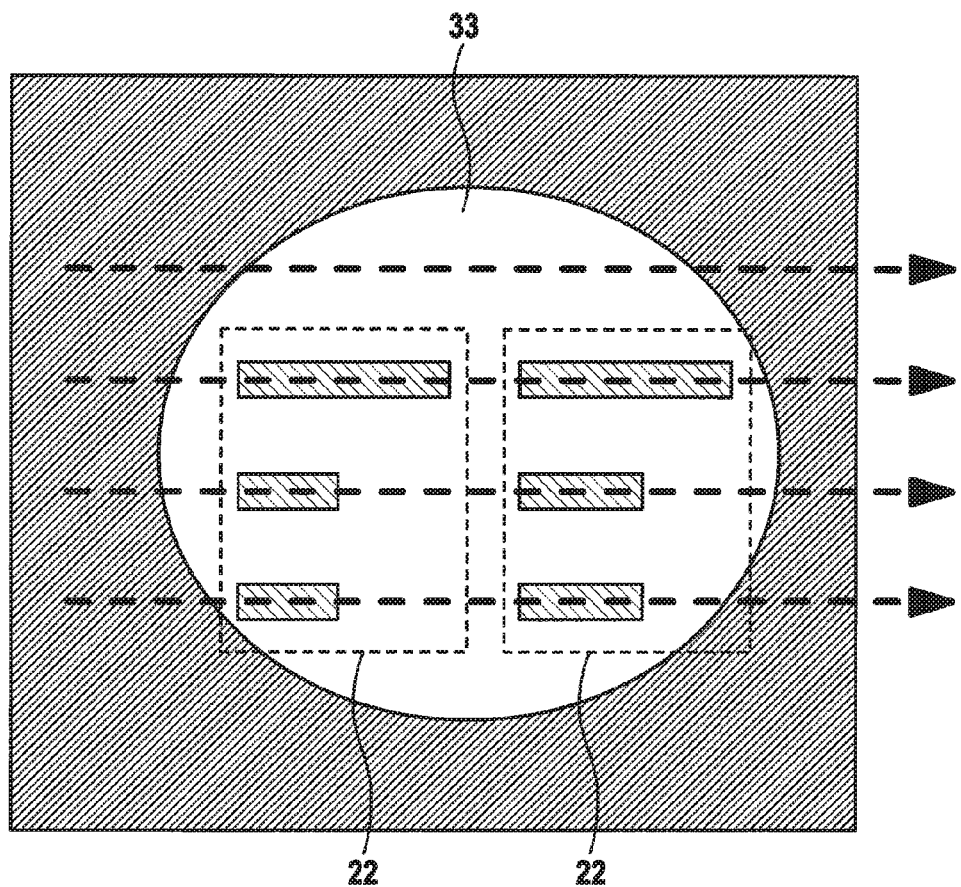
FIG. 2 shows an image resulting upon sensing of an exemplifying light-coded signal by a receiving device according to the present invention of an exemplifying embodiment of a system embodied according to the present invention for transferring information upon detection of wrong-way driving of a motor vehicle.

In other words, FIG. 2 depicts an image resulting upon sensing of an exemplifying light-coded signal 22 by receiving device 20 of an exemplifying embodiment of a system embodied according to the present invention for transferring information upon detection of wrong-way driving of a motor vehicle 1, 2, 3. Four dashed arrows here indicate the line-by-line scanning by camera system 20, which after completion of the scanning operation yields a rectangular image or rectangular frame. The light-colored circle within this image corresponds, in this exemplifying embodiment, to light cone 33 generated by headlights 11 of first motor vehicle 1. Depicted within this light cone 33 are the light tracks of three groups of identical size, disposed above another, of light-emitting diodes 12. During one sampling operation, control was applied a total of two times each to these three groups, of identical size, of light-emitting diodes 12. The application of control to all three groups occurred at the same point in time. The duration of the control application to the topmost group is selected to be longer, however, than the duration of the control application to the two lower groups. As a result of the motion of the first or second motor vehicle 1, 2 and because of the rolling shutter, i.e. because of the line-by-line scanning by camera system 20, the light emitted from the groups of light-emitting diodes 12 appears as elongated bars on the image scanned by camera system 20. This produces a repeating characteristic light pattern that corresponds to light-coded signal 22. When this light pattern, i.e. light-coded signal 22, is received and identified by receiving device 20, i.e. camera system 20, of a second motor vehicle 2, in this exemplifying embodiment the driver of second motor vehicle 2 is, purely by way of example, warned. The driver can then take active safety measures, for example braking or an evasive maneuver. Optionally, it is also possible to implement receiving devices 20 according to the present invention that furnish a control signal as soon as receiving device 20 detects that light-coded signal 22 contains an information item regarding wrong-way driving of a motor vehicle 1, 2, 3. This control signal can then, for example, initialize one of the aforementioned active safety measures.

It is also possible to implement systems according to the present invention for transferring information upon detection of wrong-way driving of a motor vehicle 1, 2, 3 in which a different light-coded signal 22, i.e. a light-coded signal 22 having a different information content, is conveyable from transmitting unit 10 to receiving device 20. In such systems according to the present invention, any conceivable information is transferable by way of transmitting device 10 of a first motor vehicle 1 to receiving device 20 of a second motor vehicle 2. A group of light-emitting diodes 12 can furthermore also have only a single light-emitting diode 12.

What is claimed is:

1. A device for transferring information upon detection of wrong-way driving of a motor vehicle, the device comprising:
   a recognition unit configured to detect wrong-way driving of a motor vehicle; and
   a transmitting unit including a light source and configured to, in response to the recognition unit detecting the wrong way driving, control the light source to emit a plurality of different light patterns over a period of time that, when combined into a single composite image of a plurality of line-by-line scans of light emitted by the light source over the period of time, form a light-coded signal that contains an information item regarding the wrong-way driving of the motor vehicle.

2. The device as recited in claim 1, wherein a headlight of the motor vehicle is the light source.

3. The device as recited in claim 2, wherein the light source is an LED headlight.

4. The device as recited in claim 2, wherein the light-coded signal is generated by modulation of the light of the light source.

5. A transmitting device for transferring information upon detection of wrong-way driving of a motor vehicle, the device comprising:
   a recognition unit configured to detect wrong-way driving of a motor vehicle; and
   a light source configured to emit a light-coded signal as soon as the recognition unit detects wrong-way driving of the motor vehicle;
   wherein the light-coded signal:
      contains an information item regarding wrong-way driving of the motor vehicle; and
      is generated by modulation of light of the light source implemented by application of control to different groups of light-emitting diodes of the light source, the duration of the application of control to the light-emitting diodes being variable over time from one group to another and being predetermined for each group of light-emitting diodes.

6. The transmitting device as recited in claim 5, wherein the light source is an LED headlight.

7. The transmitting device as recited in claim 6, wherein the LED headlight is of the motor vehicle.

8. The device as recited in claim 1, wherein the light-coded signal includes a first bar and a second bar that is longer than the first bar, and the transmitting unit is configured to control a first light of the light source to emit light for a first amount of time to generate the first bar in the composite image and control a second light of the light source to emit light for a second amount of time, which is longer than the first amount of time, to generate the second bar in the composite image.

9. A receiving device, comprising:
   an optical detector configured to receive a plurality of different light patterns emitted toward the optical detector over a period of time and execute at least one of a row-by-row and a column-by-column image scan of the received plurality of different light patterns, to thereby generate a single image of a light-coded message regarding a traffic situation.

10. The receiving device as recited in claim 9, wherein the optical detector is a camera system.

11. The receiving device as recited in claim 9, wherein the camera system has a rolling shutter.

12. A method for transmitting information upon detection of wrong-way driving of a motor vehicle, comprising:
   detecting, using a wrong-way driving detection unit, wrong-way driving of a motor vehicle; and
   in response to the detecting, emitting, using a light source, a plurality of different light patterns over a period of time that, when combined into a single composite image of a plurality of line-by-line scans of light emitted by the light source over the period of time, form a light-coded signal that contains an information item regarding the wrong-way driving of the motor vehicle.

13. A method for receiving and evaluating information regarding wrong-way driving of a motor vehicle, the method comprising:
   receiving, by an optical detector, a plurality of different light patterns emitted toward the optical detector over a period of time; and signal;
   executing, by the optical detector, at least one of a row-by-row and a column-by-column image scan of the received plurality of different light patterns, to thereby generate a single image of a light-coded message regarding a traffic situation.

14. The method as recited in claim 13, further comprising: providing a control signal in response to the message.

15. A system for transferring information upon detection of wrong-way driving of a motor vehicle, comprising:
   a transmitting device including:
      a recognition unit configured to detect wrong-way driving of a motor vehicle; and
      a transmitting unit including a light source and configured to, in response to the recognition unit detecting the wrong way driving, control the light source to emit a plurality of different light patterns over a period of time that, when combined into a single composite image of a plurality of line-by-line scans of light emitted by the light source over the period of time, form a light-coded signal that contains an information item regarding the wrong-way driving of the motor vehicle; and
   a receiving device including:
      an optical detector configured to receive the plurality of different light patterns, when emitted by a different transmitting unit toward the optical detector over a period of time, and execute at least one of a row-by-row and a column-by-column image scan of the received plurality of different light patterns, to thereby generate a single image of a light-coded message regarding the wrong-way driving.

16. A system for transferring information upon detection of wrong-way driving of a motor vehicle, the system comprising:
  a transmitting device including:
    a recognition unit configured to detect wrong-way driving of a motor vehicle; and
    a light source configured to emit a light-coded signal as soon as the recognition unit detects wrong-way driving of the motor vehicle, wherein the light-coded signal contains an information item regarding wrong-way driving of the motor vehicle; and
  a receiving device including:
    an optical detector configured to execute at least one of a row-by-row and a column-by-column image scan, and to receive and evaluate a light-coded signal emitted toward the optical detector;
  wherein the transmitting device is configured to emit the light-coded signal completely within one image scanning operation of the receiving device, and the receiving device is configured to receive the light-coded signal completely within one image.

17. The system as recited in claim 15, wherein the light-coded signal includes a first bar and a second bar that is longer than the first bar, and the transmitting unit is configured to control a first light of the light source to emit light for a first amount of time to generate the first bar in the composite image and control a second light of the light source to emit light for a second amount of time, which is longer than the first amount of time, to generate the second bar in the composite image.

* * * * *